United States Patent
Schiltz

(10) Patent No.: US 9,758,307 B2
(45) Date of Patent: Sep. 12, 2017

(54) DRUM MOTORS HAVING A POLYMER BODY SHELL

(71) Applicant: Precision, Inc., Pella, IA (US)

(72) Inventor: Brian Scott Schiltz, Algona, IA (US)

(73) Assignee: Precision, Inc., Pella, IA (US)

( * ) Notice: Subject to any disclaimer, the term of this patent is extended or adjusted under 35 U.S.C. 154(b) by 0 days.

(21) Appl. No.: 15/071,286

(22) Filed: Mar. 16, 2016

(65) Prior Publication Data

US 2016/0272433 A1 Sep. 22, 2016

Related U.S. Application Data

(60) Provisional application No. 62/135,746, filed on Mar. 20, 2015.

(51) Int. Cl.
| | |
|---|---|
| *B65G 23/00* | (2006.01) |
| *B65G 23/22* | (2006.01) |
| *B65G 23/08* | (2006.01) |
| *B65G 39/16* | (2006.01) |

(52) U.S. Cl.
CPC ............. *B65G 23/00* (2013.01); *B65G 23/08* (2013.01); *B65G 23/22* (2013.01); *B65G 39/16* (2013.01)

(58) Field of Classification Search
CPC ........ B65G 23/04; B65G 23/08; B65G 23/22; B65G 39/16; B65G 39/20
USPC .......... 198/832, 834, 835, 788; 474/153–199
See application file for complete search history.

(56) References Cited

U.S. PATENT DOCUMENTS

| | | | | |
|---|---|---|---|---|
| 2,368,689 | A * | 2/1945 | Thomas | D03D 25/00 139/425 R |
| 3,118,532 | A | 1/1964 | Osgood | |
| 3,929,391 | A | 12/1975 | Pico | |
| 7,021,457 | B1 | 4/2006 | Schiltz | |
| 7,189,785 | B2 * | 3/2007 | Okuno | C08K 5/01 474/237 |
| 7,270,232 | B2 | 9/2007 | Schiltz | |
| 7,771,333 | B2 * | 8/2010 | Spiess | B65G 39/12 193/37 |
| 2009/0294255 | A1 * | 12/2009 | Szarkowski | B65G 23/08 198/788 |
| 2011/0155539 | A1 | 6/2011 | Schmidt et al. | |
| 2016/0130092 | A1 * | 5/2016 | Rudolph | B65G 39/07 198/842 |

FOREIGN PATENT DOCUMENTS

| | | |
|---|---|---|
| DE | 1138686 | 10/1962 |
| DE | 19639091 A1 | 3/1998 |
| DE | 202009012644 U1 | 12/2009 |
| DE | 202013003913 | 7/2013 |
| EP | 0483124 A2 | 4/1992 |
| GB | 806179 | 12/1958 |

OTHER PUBLICATIONS

Lagging for Thermoplastic Non-Modular Belts, Interroller, pp. 1, available before Mar. 20, 2015.

* cited by examiner

*Primary Examiner* — William R Harp
(74) *Attorney, Agent, or Firm* — Armstrong Teasdale LLP

(57) ABSTRACT

Drum motors for driving a conveyor belt are disclosed. In some embodiments, the drum motors include a shell having a polymer body such as wax-filled cast nylon.

22 Claims, 4 Drawing Sheets

DRUM MOTORS HAVING A POLYMER BODY SHELL

CROSS-REFERENCE TO RELATED APPLICATION

This application claims the benefit of U.S. Provisional Application No. 62/135,746, filed Mar. 20, 2015, which is incorporated herein by reference in its entirety.

FIELD OF THE DISCLOSURE

The field of the disclosure relates to drum motors for driving a conveyor belt and, in particular, drum motors having a polymer body shell.

BACKGROUND

Conveyor belt systems are commonly used to move goods. Such systems include a drive roller, tail roller and a belt looped around the drive roller and tail roller. The drive roller may be driven by an external motor that is connected to the drive roller through a hub or shaft. Alternatively, the drive roller may be driven by an internal motor within the roller. Such rollers having an internal motor are commonly referred to in the art as "drum motors" or "motorized pulleys."

Drum motors include a shell that engages the belt during rotation and which houses the motor. End caps are fitted within the shell at both ends to seal the drum motor internals. A shaft extends through the end caps and is fixed to an external structural component (e.g., conveyor belt framework) to allow the shell and end caps to rotate about the shaft. The motor is attached to the shaft within the shell. The motor engages gears attached to the end cap to force the end cap to rotate. This rotation is translated through the end cap to the shell. A lubricating fluid is added to the inner chamber formed between the shell and end caps to lubricate moving components. The shell and end caps are conventionally metal to properly seal the inner chamber and to prevent the shell from slipping relative to the end caps during rotation.

Metal shells and, particularly stainless shells, commonly stain the conveyor belt which affects the aesthetics of the system and is a concern in food grade environments. Further, use of metal shells may in some instances cause belt lugs to overrun pulley grooves. Conventional drum motors also operate at relatively high temperatures which reduces the lifetime of the motor.

A need exists for new drum motors that are less costly, do not stain conveyor belts and that may be operated at relatively lower temperatures while maintaining a fluid-tight seal.

This section is intended to introduce the reader to various aspects of art that may be related to various aspects of the disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

One aspect of the present disclosure is directed to a drum motor for driving a conveyor belt. The drum motor includes a drum motor shell comprising a cylindrical body made of a polymer. The drum motor shell defines a component chamber therein. A shaft extends into the component chamber. A drive motor is within the component chamber for powering the drum motor to cause the drum motor shell to rotate about the shaft.

Another aspect of the present disclosure is directed to a method for producing a drum motor. A cylindrical drum motor shell made of a polymer is provided. The shell has an outer surface, an inner surface and an inner chamber. A motor and shaft are inserted into the inner chamber of the drum motor shell. A first end cap and a second end cap are press-fit into the drum motor shell.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

Corresponding reference characters indicate corresponding parts throughout the drawings.

DETAILED DESCRIPTION

Figure 1:
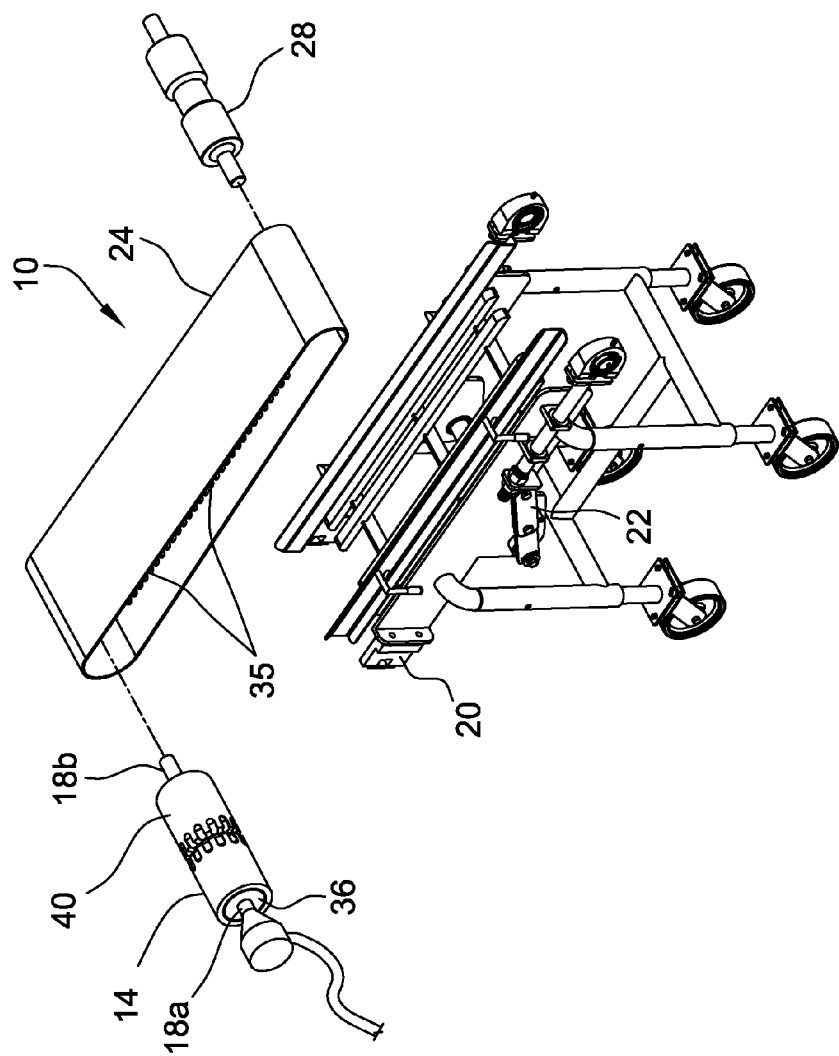
FIG. 1 is an exploded, perspective view of a conveyor belt system.

With reference to FIG. 1, a conveyor belt system 10 for transporting goods is shown. The conveyor belt system 10 includes a drum motor 14 having a shell 40 that rotates about a shaft having two sections 18*a*, 18*b*. The shaft sections 18*a*, 18*b* are attached to a frame 20. An endless conveyor belt 24 rotates about the drum motor 14 and a tail pulley 28. The system 10 may include a number of idler rollers (not shown) to support the belt 24 during use. The system 10 includes a belt tensioner 22 for tightening the belt 24 around the drum motor 14 and tail pulley 28.

Figure 2:
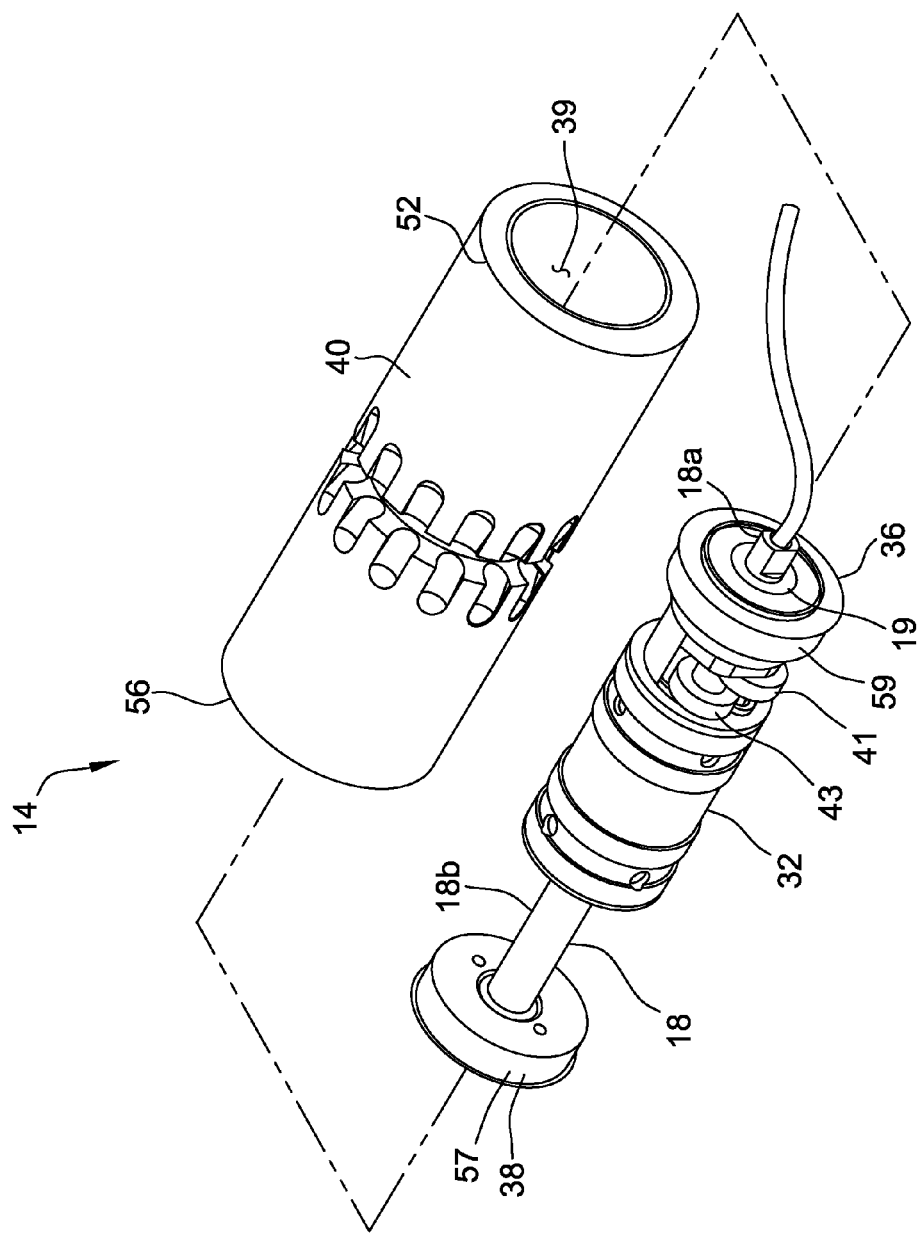
FIG. 2 is an exploded, perspective view of a drum motor.

Referring now to FIG. 2, the drum motor 14 includes a drum motor shell 40 and a first end cap 36 and a second end cap 38. As assembled, the shell 40 and first and second end caps 36, 38 form a component chamber 39 within the drum motor 14. The shaft 18 extends into the component chamber 39. Each shaft section 18*a*, 18*b* extends through an end cap 36, 38. The sections 18*a*, 18*b* of the shaft 18 may extend through bearings (one bearing 19 being shown) to allow the end caps 36, 38 and shell 40 to rotate about the shaft 18.

A drive motor 32 is attached to the shaft 18 for powering the drum motor 14 to cause the drum motor shell 40 and end caps 36, 38 to rotate about the shaft 18. The drive motor 32 is housed within the component chamber 39. The first end cap 36 is attached to a gear 41 for engaging a gear 43 of the motor 32.

Figure 3:
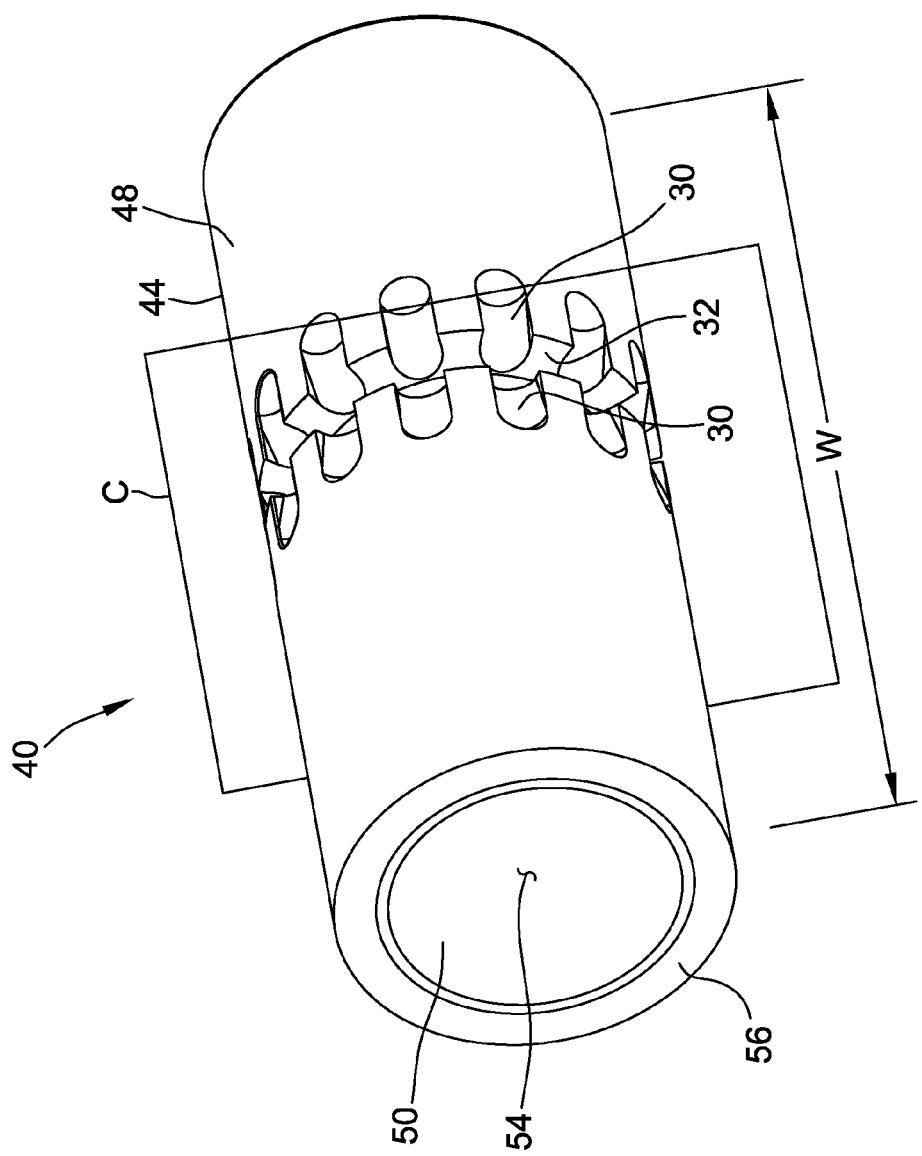
FIG. 3 is a perspective view of the drum motor shell of the drum motor of FIG. 2.
Figure 4:
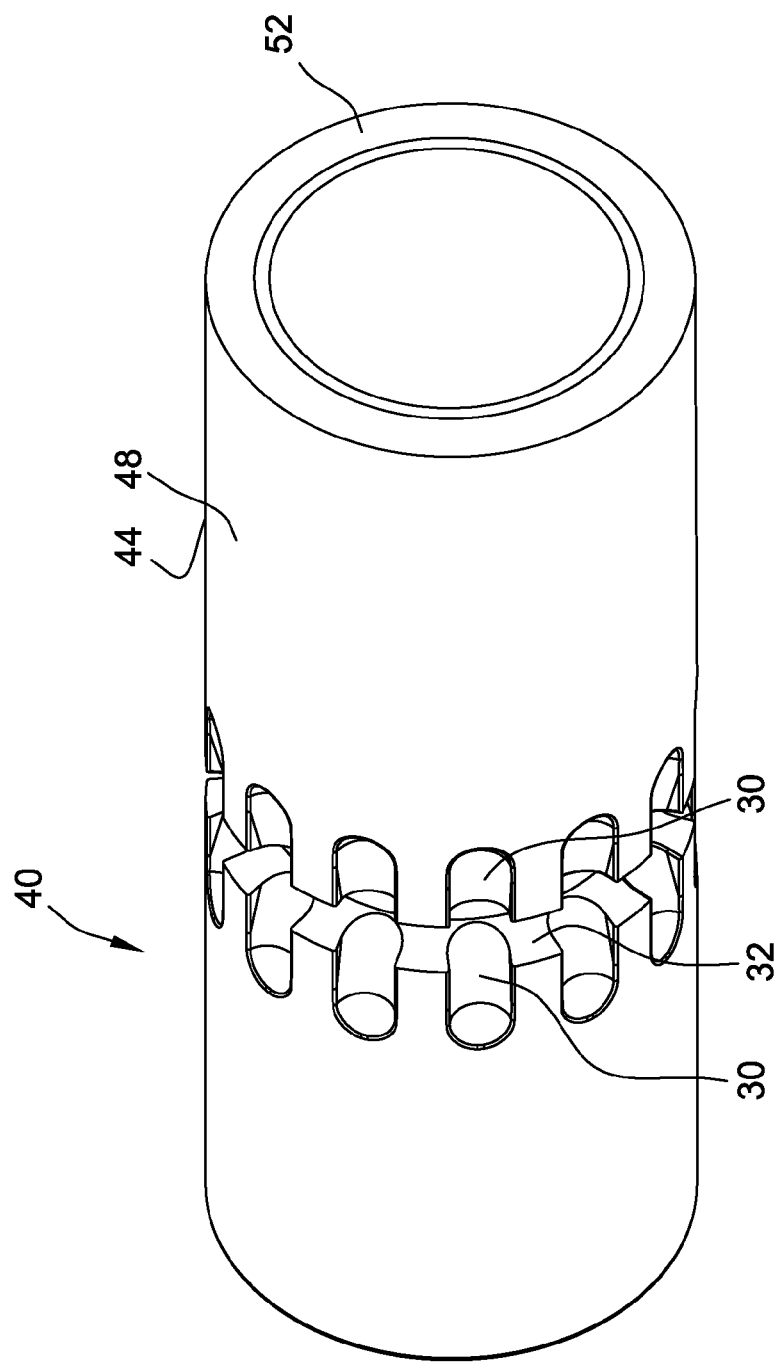
FIG. 4 is another perspective view of the drum motor shell.

The drum motor 14 includes a drum motor shell 40 (FIG. 3) that engages the belt 24 (FIG. 1) during rotation. The drum motor shell 40 includes a cylindrical polymer body 44 having an outer surface 48, an inner surface 50 and an inner chamber 54. The polymer body 44 has a first end 52 (FIG. 4) and a second end 56 (FIG. 3) that define a width W of the polymer body 44. The polymer body 44 has a widthwise central plane C (FIG. 3) that extends through the body 44 that is midway between the first end 52 and the second end 56.

Each end cap 36, 38 has an outer surface 57, 59 (FIG. 2). The outer surfaces 57, 59 directly contact the inner surface 50 (FIG. 3) of the polymer body 44. Generally, the inner surface 50 of the polymer body is bored to have an inner diameter with a relatively small tolerance (e.g., ±0.02" or less, ±0.015" or less or even ±0.010" or less). The end caps may be press-fit with a minimum press-fit of 0.006". In other embodiments, the outer surface 57, 59 of the end caps 36, 38 and the inner surface 50 (FIG. 3) of the polymer body 44 are separated by a gasket or other material for sealing the component chamber 39 (FIG. 2). The polymer body 44 may have portions with different bore diameters to accommodate various components which may be sized differently (e.g., end caps and motor).

The polymer body 44 is composed of a polymer material with suitable strength, heat dissipation, friction and durability. In this regard, the term "polymer" as used herein is intended to include any material that has repeated sub-units unless stated otherwise. In some embodiments, the polymer body has a tensile modulus of at least 100,000 psi and/or a tensile strength of at least about 5,000 psi (ASTM D638).

In accordance with the present disclosure, the polymer body 44 may be made of nylon and, in particular, cast nylon type 6 (which may be referred to as "polycaprolactam", "polyamide 6" or simply "PA6"). In some embodiments, the cast nylon material incorporates a lubricant such as oil or a solid lubricant to lower the coefficient of friction (thereby reducing heat generation) and improve wear resistance. Alternatively or in addition, the cast nylon material may incorporate wax to cause the polymer body to resist water absorption (and resulting expansion of material which could degrade the fluid-tight seal). Such wax material may also improve wear-resistance and lower the coefficient of friction. The cast nylon material may include lubricant and/or wax in amounts suitable for use in conveying environments. Generally the polymer body 44 is composed of about 90 wt % to about 100 wt % cast nylon (e.g. wax-filled, lubricated cast nylon).

In other embodiments, the polymer body is made of acetal (i.e., polyoxymethylene) or ultra-high molecular weight polyethylene (i.e., having at least 100,000 monomers of ethylene).

The polymer body 44 contains polymer (e.g., cast nylon) throughout its thickness (i.e., from the outer surface 48 to the inner surface 50) and from its first end 52 to its second end 56. Stated otherwise, the polymer body 44 may consist of polymer (e.g., cast nylon) or consist essentially of polymer (e.g., contain less than 5 wt % of other materials and/or impurities). The polymer body 44 may be formed by machining a rod or tube of the polymer material to produce the desired polymer body shape as opposed to methods that involve molding.

As used herein, "polymer body" excludes composite structures in which polymer materials are applied to a substrate such as a metal shell (e.g., lagging). Such lagging materials may include vulcanized rubber (e.g., SBR, neoprene, nitrile, urethane, EPDM, ABS, HDPE, natural rubber and the like). Generally, the shell 40 does not include any metal.

The shell 40 may include elements at its outer surface 48 for driving the conveyor belt 24 (FIG. 1) around the drum motor 14. In the illustrated embodiment, the polymer body 44 includes multiple drive roller lug grooves 30 and a drive roller belt slot 32 as with "K-V" type drive pulleys as disclosed in U.S. Pat. No. 7,270,232 and U.S. Pat. No. 7,021,457, both of which are incorporated herein by reference for all relevant and consistent purposes. The drive roller lug grooves 30 are parallel to the axis of rotation of the drum motor 14 and are configured to mate with corresponding lugs 35 (FIG. 1) of the conveyor belt 24. The combination of grooves 30 and lugs 35 act as a positive driving force for the belt (i.e., the drum motor 14 includes elements for engaging a positive drive solid homogeneous belt or plastic modular belt). The drive roller belt slot 32 is perpendicular to the axis of rotation of the shell 40 and allows the drum motor 14 to be used with a standard conveyor belt with a belt, such as a V-belt, incorporated into the bottom side of the conveyor belt.

In other embodiments, the polymer body does not include a drive roller belt slot 32 and/or includes grooves 30 that extend the width of the polymer body 44. In other embodiments, the drum motor 14 includes sprockets (not shown) for driving a plastic modular belt.

Alternatively to positive drive drum motors, the drum motor 14 may include elements for driving a friction drive belt. In some embodiments, the polymer body 44 includes a knurling detail (e.g., herringbone, diamond or straight groove) on its outer surface 48. The polymer body 44 may include longitudinal grooves or a diamond pattern at its outer surface 48. Alternatively or in addition, the polymer body may include one or more V-grooves for belt tracking. In some embodiments, the polymer body 44 is crowned at its outer surface or may even include various timing features.

In some embodiments, the shell 40 includes a first and second flanges (not shown) at the shell ends to help track the belt 24 (FIG. 1) during use. Such flanges may form part of the cylindrical polymer body 44 (e.g., may be composed of nylon).

The drum motor 14 may be assembled by press-fitting the second end cap 38 into the polymer body 44 at its second end 56. Other components (e.g., motor, bearings, shaft sections, motor, gears and the like) are inserted into the component chamber. The first end cap 36 is then press-fit into the first end 52 of the polymer body 44.

Compared to conventional drum motors, embodiments of the drum motor described above have several advantages. By using a shell having a polymer body, the shell is lightweight (which allows it to be installed relatively easy), made of less costly materials, does not stain conveyor belts and may be manufactured relatively fast while maintaining the necessary rigidity and durability for conveying operations. The polymer body may also help dissipate heat from the drum motor which increases the lifetime of the motor. Testing has shown that the drum motor may operate at an internal temperature of about 135° F. while drum motors with conventional metals shells operate at a temperature between about 200-250° C.

In embodiments in which the polymer body is composed of cast nylon, the polymer body is able to maintain a fluid-tight seal with the end-caps without any intermediate material (e.g., gasket or other sealer). Cast nylon may be a more economical starting material compared to acetyl. In embodiments in which the polymer body is composed of wax-filled cast nylon, the polymer body may resist water absorption and may be characterized by improved wear-resistance and a lower coefficient of friction. Wax-filled nylon maintains a fluid-tight seal with the end caps as the material does not appreciably absorb moisture which prevents the shell from expanding (e.g., the central bore in which the end caps are press-fit does not expand during operation). Cast nylon materials are also more durable relative to other materials such as acetyl (e.g., allow the drum motor shell to include flanges that are less prone to breakage to be used).

In embodiments in which the bore through the polymer body is manufactured with a tolerance of ±0.02" or less (and with a minimum press-fit of 0.006"), a fluid-tight seal between the polymer body and the end caps is promoted.

As used herein, the terms "about," "substantially," "essentially" and "approximately" when used in conjunction with ranges of dimensions, concentrations, temperatures or other physical or chemical properties or characteristics is meant to cover variations that may exist in the upper and/or lower limits of the ranges of the properties or characteristics, including, for example, variations resulting from rounding, measurement methodology or other statistical variation.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing[s] shall be interpreted as illustrative and not in a limiting sense.

What is claimed is:

1. A drum motor for driving a conveyor belt comprising:
   a drum motor shell comprising a cylindrical body made of wax-filled cast nylon, the drum motor shell defining a component chamber therein;
   a shaft that extends into the component chamber; and
   a drive motor within the component chamber for powering the drum motor to cause the drum motor shell to rotate about the shaft.

2. The drum motor as set forth in claim 1 wherein the cast nylon is lubricant filled.

3. The drum motor as set forth in claim 1 wherein the drum motor shell has a first end and a second end, the drum motor comprising:
   a first end cap that extends within the first end of the drum motor shell; and
   a second end cap that extends within the second end of the drum motor shell, the shaft extending through the first end cap.

4. The drum motor as set forth in claim 3 wherein the first end cap and second end cap directly contact the drum motor shell.

5. The drum motor as set forth in claim 1 comprising elongated lug grooves formed on the outer surface of the shell and spaced around the circumference of the shell, the lug grooves being parallel to a rotational axis of the shell for engaging corresponding lugs of a belt during rotation of the belt to drive the conveyor belt around the shell.

6. The drum motor as set forth in claim 5 comprising a slot formed on the outer surface of the shell in communication with and transverse to the lug grooves.

7. The drum motor as set forth in claim 1 wherein the cylindrical body has a tensile modulus of at least 100,000 psi and a tensile strength of at least about 5,000 psi.

8. A conveyor belt system for transporting materials, the system comprising:
   the drum motor as set forth in claim 1;
   a tail pulley;
   a conveyor belt, the conveyor belt being looped around the drum motor and the tail pulley.

9. The conveyor belt system as set forth in claim 8 wherein the shell includes elongated lug grooves formed on the outer surface of the shell and spaced around the circumference of the shell, the conveyor belt having lugs for engaging the grooves during rotation of the belt to drive the conveyor belt around the shell.

10. A method for producing a drum motor comprising:
    providing a cylindrical drum motor shell made of wax-filled cast nylon and having an outer surface, an inner surface and an inner chamber;
    inserting a motor and shaft into the inner chamber of the drum motor shell;
    press-fitting a first end cap into a first end of the drum motor shell; and
    press-fitting a second end cap into the second end of the drum motor shell.

11. The method as set forth in claim 10 comprising:
    providing a rod or tube made of wax-filled cast nylon; and
    machining the rod or tube to the shape of the cylindrical drum motor shell.

12. The method as set forth in claim 10 wherein the first end cap and second end cap directly contact the drum motor shell after press-fitting.

13. A drum motor for driving a conveyor belt comprising:
    a drum motor shell comprising a cylindrical body made of wax-filled cast nylon, the cylindrical body having a tensile modulus of at least 100,000 psi and a tensile strength of at least about 5,000 psi, the drum motor shell defining a component chamber therein;
    a shaft that extends into the component chamber; and
    a drive motor within the component chamber for powering the drum motor to cause the drum motor shell to rotate about the shaft.

14. The drum motor as set forth in claim 13 wherein the cast nylon is lubricant filled.

15. The drum motor as set forth in claim 13 wherein the drum motor shell has a first end and a second end, the drum motor comprising:
    a first end cap that extends within the first end of the drum motor shell; and
    a second end cap that extends within the second end of the drum motor shell, the shaft extending through the first end cap.

16. The drum motor as set forth in claim 15 wherein the first end cap and second end cap directly contact the drum motor shell.

17. The drum motor as set forth in claim 13 comprising elongated lug grooves formed on the outer surface of the shell and spaced around the circumference of the shell, the lug grooves being parallel to a rotational axis of the shell for engaging corresponding lugs of a belt during rotation of the belt to drive the conveyor belt around the shell.

18. The drum motor as set forth in claim 17 comprising a slot formed on the outer surface of the shell in communication with and transverse to the lug grooves.

19. A method for producing a drum motor comprising:
    providing a wax-filled cast-nylon rod or tube; and
    machining the rod or tube to the shape of a cylindrical drum motor shell having an outer surface, an inner surface and an inner chamber;

inserting a motor and shaft into the inner chamber of the drum motor shell;

press-fitting a first end cap into a first end of the drum motor shell; and press-fitting a second end cap into the second end of the drum motor shell.

20. The method as set forth in claim 19 wherein the rod or tube is machined to have a bore with a tolerance of ±0.02" or less.

21. The method as set forth in claim 20 wherein the first end cap and second end cap are press-fit with a 0.006" minimum press fit.

22. The method as set forth in claim 19 wherein the first end cap and second end cap directly contact the drum motor shell after press-fitting.

* * * * *